(12) United States Patent
Gupta et al.

(10) Patent No.: US 12,408,044 B2
(45) Date of Patent: Sep. 2, 2025

(54) SYSTEM AND METHOD FOR AUTOMATED PLANNING OF NEXT GENERATION TELECOM NETWORK

(71) Applicant: JIO PLATFORMS LIMITED, Gujarat (IN)

(72) Inventors: Ajay Kumar Gupta, Pune (IN); Arun Nair, Mumbai (IN); Aditya Ganesh, Mumbai (IN); Aayush Bhatnagar, Mumbai (IN); Dharmesh Chitaliya, Thane (IN); Atul Verma, Uttar Pradesh (IN); Shubham Gupta, Madhya Pradesh (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 800 days.

(21) Appl. No.: 17/456,877

(22) Filed: Nov. 29, 2021

(65) Prior Publication Data
US 2022/0174504 A1      Jun. 2, 2022

(30) Foreign Application Priority Data
Nov. 30, 2020    (IN) .............................. 202021052180

(51) Int. Cl.
| | | |
|---|---|---|
| *H04W 16/18* | (2009.01) | |
| *H04W 16/22* | (2009.01) | |
| *H04W 16/32* | (2009.01) | |
| *H04W 24/02* | (2009.01) | |

(52) U.S. Cl.
CPC .......... *H04W 16/18* (2013.01); *H04W 16/22* (2013.01); *H04W 16/32* (2013.01); *H04W 24/02* (2013.01)

(58) Field of Classification Search
CPC ..... H04W 16/18; H04W 16/22; H04W 16/32; H04W 24/02
See application file for complete search history.

(56) References Cited

U.S. PATENT DOCUMENTS

| | | | | |
|---|---|---|---|---|
| 2011/0237252 | A1* | 9/2011 | Kim ................. | H04W 36/0085 455/434 |
| 2013/0040648 | A1* | 2/2013 | Yang .................... | H04W 16/18 455/446 |
| 2015/0087321 | A1* | 3/2015 | Scherzer ............... | H04W 24/02 455/446 |

(Continued)

*Primary Examiner* — Faruk Hamza
*Assistant Examiner* — Tito Q Pham
(74) *Attorney, Agent, or Firm* — FINNEGAN, HENDERSON, FARABOW, GARRETT & DUNNER, LLP

(57) ABSTRACT

The present disclosure provides the planning of the next generation network which complements an existing telecom deployment to achieve the desired KPIs from the combined network for both macro and small cell planning in an existing network in a cost-effective method to deploy ODSC cells and Macro Cells in a heterogeneous network. Planning a next-generation network for an existing telecom operator is a large undertaking, utilizing precious man-hours and most importantly, weeks of work. Using an automated planning methodology to plan macro and small cells for a region like a city, state or even country, planners can deploy solutions to make the most optimum use of existing infrastructure. The invention proposes an automated approach to plan the preferred overlay telecom solutions in an area A being part of an existing telecom deployment.

16 Claims, 6 Drawing Sheets

(56) References Cited

U.S. PATENT DOCUMENTS

| | | | |
|---|---|---|---|
| 2015/0373744 A1* | 12/2015 | Rosa | H04W 72/21 |
| | | | 370/329 |
| 2017/0150365 A1* | 5/2017 | Goswami | H04W 16/18 |
| 2022/0256364 A1* | 8/2022 | Jat | H04W 16/22 |
| 2024/0196231 A1* | 6/2024 | Farooq | H04L 41/145 |

* cited by examiner

1+1 Planning Orientation

1+0 Planning Orientation

1+2 Planning Orientation

1+3 Planning Orientation

SYSTEM AND METHOD FOR AUTOMATED PLANNING OF NEXT GENERATION TELECOM NETWORK

TECHNICAL FIELD

The present disclosure relates to telecommunication and more particularly to zero-touch telecommunications planning automation and is intended to be used for efficient deployment of the next generation telecom network.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today with the advent of wireless technology like GSM, EDGE, HSPA, LTE, and the like, all communications in a wireless network provide various communication services such as voice, video, data, advertisement, content, messaging, broadcasts, etc. One example of such a network is the Evolved. Universal Terrestrial Radio Access (E-UTRA) which is a radio access network standard meant to be a replacement of the UMTS and HSDPA/HSUPA technologies specified in 3GPP releases 5 and beyond. E-UTRA is the air interface of 3GPP's Long Term Evolution (LTE) upgrade path for mobile networks. Unlike HSPA, LTE's E-UTRA is an entirely new air interface system, unrelated to and incompatible with W-CDMA. It provides higher data rates, lower latency and is optimized for packet data. The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. With the capacity and higher data transfer speeds, there are many problems associated with the cells and the optimization of the cells.

In 5G cellular deployment, macro cells, along with various small cells, are planned to provide coverage and capacity solution across the target area, Thus, inter-site distance becomes narrower for the network. Further, a greater number of sites/eNodeBs are required to mitigate on-going data demand in the emerging network, which creates dense to hyper-dense radio access network in big cities.

Currently, network planning is a long-drawn activity involving thousands of man-hours from highly skilled telecom planning engineers, taking months to perform. The Network Planning is a long-drawn and tedious activity, involving 1000 of engineers working over months, breaking up and analyzing large datasets individually before finally devising a plan.

The Radio Frequency (RF) characteristics (e.g., RF propagation) define the area of coverage for a cell tower. A sector is a geographical area, having a distinct size and shape, covered by a single antenna. For example, a service provider may use several antennas to provide 360 degrees of RF coverage for a cell. A service provider may use one cell tower to provide wireless communication services to subscribers for a few tens of meters radius in urban settings, while for a rural area, the service provider may use one cell tower for an area of several square miles. To ensure a good quality of experience for subscribers and maximum usage of the network, every service operator needs a complete view of the network and the ability to accurately analyze different deployment scenarios. The accuracy of RF Planning has a direct impact on how the network scenario can be optimized in order to maximize network capacity, coverage and network performance. The calibration of RF planning is often required when deploying in new frequency bands and new geographical areas. Today, most of the operators perform the initial RF planning based on link budget and standard propagation model with low-resolution map data. The RF planning is a multi-step process and iterative in nature and is a very vital step for a wireless communication technology and is carried out manually by changing physical parameters of a site, as per the conventional approach. LTE radio network planning also works just like other cellular technologies. Whenever new cellular technology is considered for mass deployment, many RF parameters are subjected to a tuning process with a view to find out an optimum value. However, this phase is time-consuming and is expensive. Therefore, before commercial deployment, if an extensive simulation is carried out, then the tuning phase can be facilitated in numerous ways. Hence, running simulation before mass commercial deployment minimizes the cost with a greater extent. Clearly, optimizing vital parameters in a least possible time is a challenging issue for network operators, The RF planning tool-based prediction is an essential requirement in the process of network planning.

The conventional techniques for modelling RF propagation are based on either empirical measurements or ray-tracing methods. Empirical methods, for example, are based solely on extensive measurements made in generic settings at different sites, and are therefore dependent on the site locations, the measurement methods, measurement frequencies, and the like. In particular, the signal strength is measured at a number of different locations and at different heights, with different empirical models used for different generic propagation problems, e.g. for rural, suburban, and urban propagation environments. However, there is no consideration of details of the propagation environment, e.g. actual building and street locations and configurations. Therefore, while empirical methods can predict order-of-magnitude of average propagation loss, they cannot predict tine details about the propagation channel like dead zones and multipath interference. Moreover, empirical methods are based on statistics regarding experiments without sufficient underlying logic to enable generalization to environments other than those in which the experiments were conducted.

The method of ray-tracing is a deterministic method which is based on geometrical optics and the uniform theory of diffraction (UTD) and can be used to calculate propagation mechanisms such as the direct (LOS), reflected, transmitted, diffracted, and some combined rays. The ray-tracing method is not based on extensive measurements, but rather relies on site-specific information such as actual geometric and structural information of the building, e.g. the façade structure and geometry. The basic procedure of the ray-tracing method is the shooting-and-bouncing ray (SBR) algorithm involving three basic processes, with the first process launching a ray. The second process is determining if the ray hits an object in what is known as the ray-object intersection test, Moreover, the third is determining whether a ray is received at a receiver location, The above existing approaches of planning a next generation network over an area do not consider the problems of the already deployment network in the area and therefore the outcome of the planning does not complement well with the existing deployment. There are currently several challenges in the existing system which are listed as follows:

There is no solution available that provides various knobs in terms of configuration parameters to tweak the planning requirements in planning stages in real time.

There is no solution available that provides implementation in a pipelined manner to ensure reliability and scalability and implemented by independent modules.

There is no solution available that provides planning approach where various option of configuration are available for Outdoor Small Cells solutions.

There is no solution available that provides planning approach for both macro and outdoor small cells solution for next generation telecom network.

There is therefore a need for an advancement in planning of the next generation network which complements an existing telecom deployment to achieve the desired KPIs from the combined network for both macro and small cell planning in an existing network in a cost-effective method to deploy ODSC cells and Macro Cells in a heterogeneous network.

This disclosure proposes the planning of the next generation network which complements an existing telecom deployment to achieve the desired KPIs from the combined network for both macro and small cell planning in an existing network in a cost-effective method to deploy ODSC cells and Macro Cells in a heterogeneous network.

OBJECTS OF THE PRESENT DISCLOSURE

Some of the objects of the present disclosure, which at least one embodiment herein satisfies are as listed herein below.

An object of the present disclosure is to provide for a system that facilitates various knobs in terms of configuration parameters to tweak the planning requirements in planning stages in real time.

An object of the present disclosure is to provide for a system that facilitates implementation of solutions in a pipelined manner to ensure reliability and scalability and implemented by independent modules.

An object of the present disclosure is to provide for a planning approach where various option of configuration are available for Outdoor Small Cells solutions.

An object of the present disclosure is to provide for a planning approach for both macro and outdoor small cells solution for next generation telecom network.

An object of the present disclosure is to provide for a system which complements an existing telecom deployment to achieve the desired KPIs from the combined network for both macro and small cell planning in an existing network in a cost-effective method to deploy ODSC cells and Macro Cells in a heterogeneous network.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system facilitating telecom overlay deployment in an area. The system may include a plurality of user equipment operatively coupled to a network, a plurality of macro cells and small cells associated with the network and communicatively coupled to the user equipment, a planning server comprising a processor that executes a set of executable instructions that are stored in a memory, upon which execution, the processor may cause the system to: build a plurality of grids of a predefined size. The processor may also cause the system to extract a set of samples that pertain to spatial measurement of the grids observed from the area. The spatial measurement samples may pertain to latitude and longitude, traffic consumed, serving cell identifier, user handset categorization and cell capacity indicator. Further, the processor may cause the system to map the extracted set of samples onto the plurality of grids of; and based on the mapped extracted samples and deployment criteria, the processor may determine one or more solution sets for each grid of the plurality of grids.

In an aspect, the present disclosure provides for a method facilitating telecom overlay deployment in an area. The method may include the steps of building a plurality of grids of a predefined size. The plurality of grids may correspond to a plurality of macro cells and small cells associated with a plurality of user equipment operatively coupled to the network. The method may also include the step of extracting a set of samples pertaining to spatial measurement of the grids observed from the area, the spatial measurement samples may correspond to latitude and longitude, traffic consumed, serving cell identifier, user handset categorization and cell capacity indicator. Furthermore, the method may include the step of mapping the extracted set of samples onto the plurality of grids and based on the mapped extracted samples and deployment criteria, determining one or more solution sets for each grid of the plurality of grids.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used. to implement such components.

DETAILED DESCRIPTION

Figure 1:
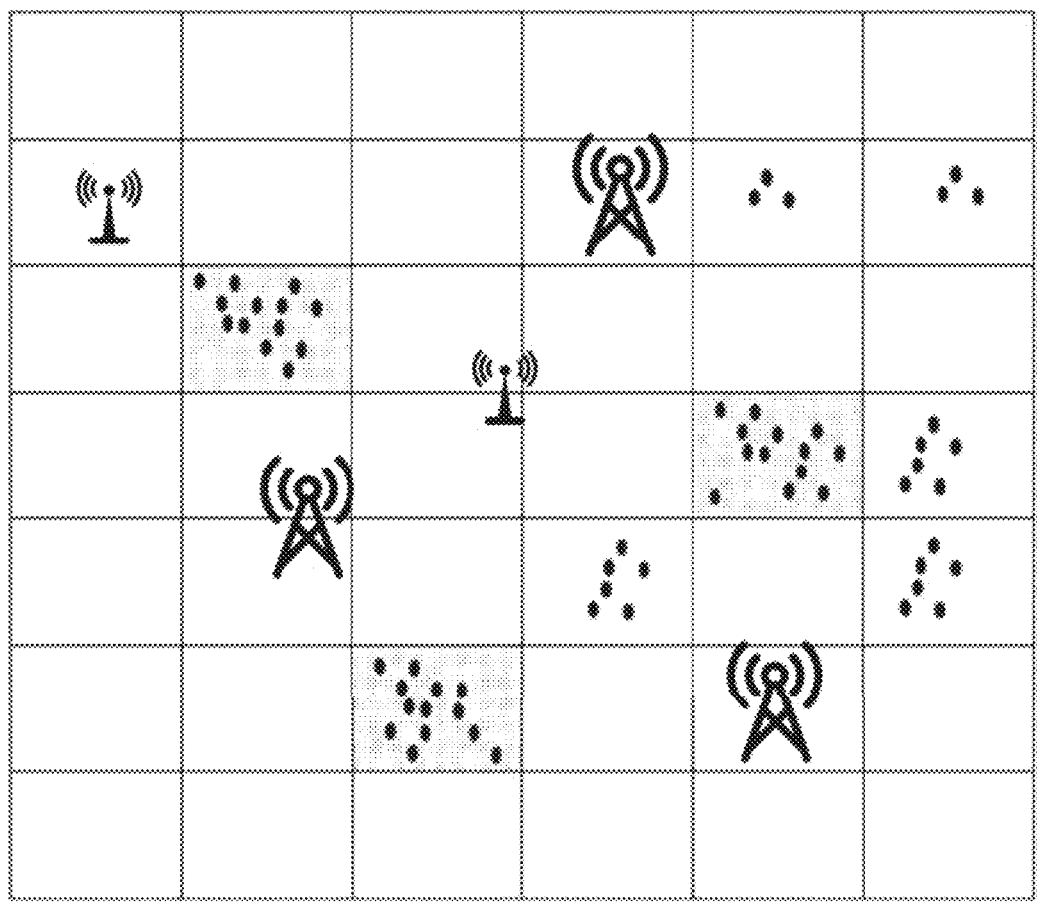
FIG. 1 illustrate existing telecom deployment in accordance with an embodiment of the present disclosure.

In the following description, for the purposes of explanation, various specific details are set forth in order to provide a thorough understanding of embodiments of the present invention, It will be apparent, however, that embodiments of the present invention may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present invention are described below, as illustrated in various drawings in which like reference numerals refer to the same parts throughout the different drawings.

In an aspect, the present disclosure relates to planning of the next generation network which complements an existing telecom deployment to achieve the desired KPIs from the combined network for both macro and small cell planning in an existing network in a cost-effective method to deploy outdoor small cell solutions and Macro Cells in a heterogeneous network.

In an aspect, FIG. 1 illustrates a typical legacy telecom network, where a combination of plurality of solutions like macro cells 1003 and small cells [1005] may exist. As user equipment communicate on the network, they may generate data samples, which may belong to a certain geo location [1004]. Geolocated samples generated by UEs in an existing telecom network may be used and mapped into by way of example and not by limitation a rectangular geo grid [1001] of predefined size, Each Grid [1001] may be tagged with one or more samples (also interchangeably referred to as aggregated parameters) computed by aggregating the data of constituent samples. Therefore, a Targeted Grid dataset grid filter may be finally achieved for the telecom network area under consideration. This Grid Dataset may be then used to plan solutions for a next generation network in the area.

Figure 2A:
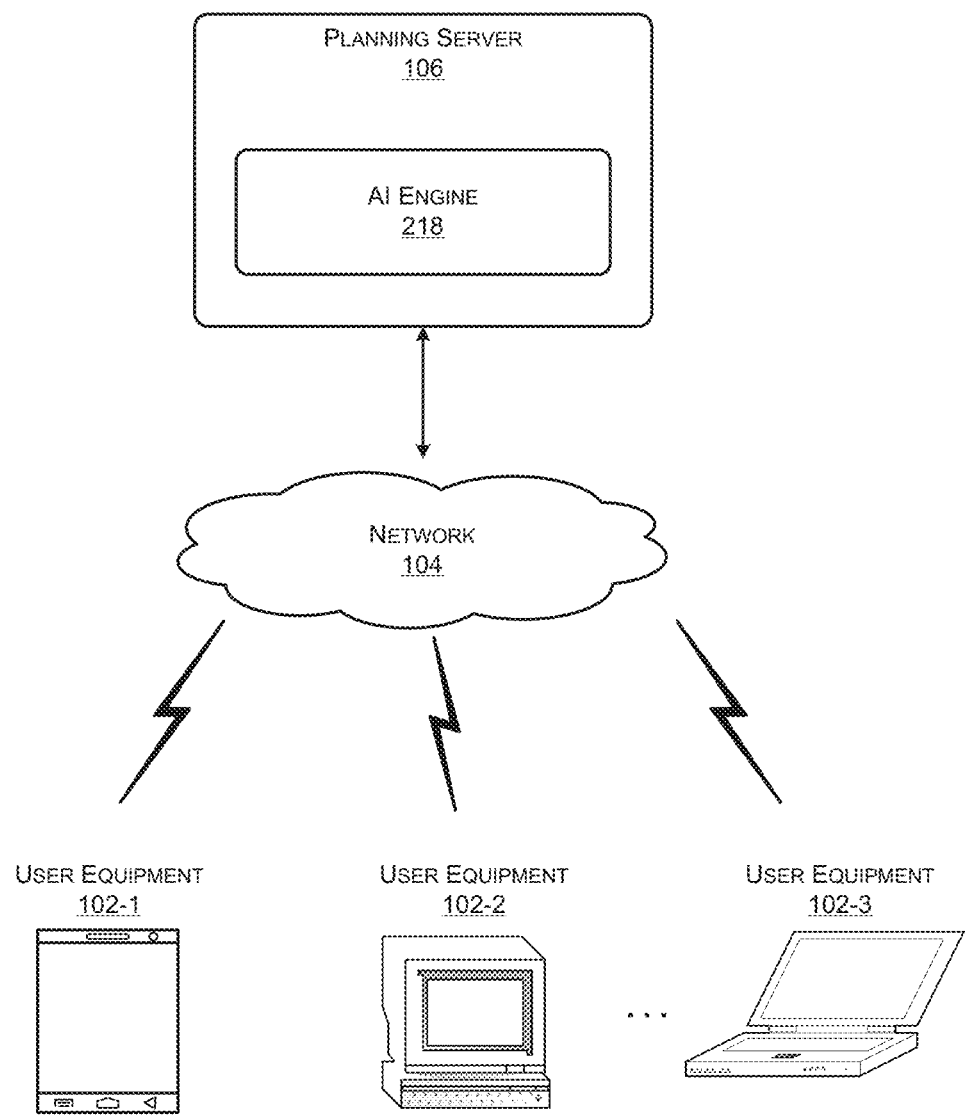
FIG. 2A illustrates an exemplary network architecture in which or with which the system of the present disclosure can be implemented, in accordance with an embodiment of the present disclosure.

FIG. 2A illustrates an exemplary network architecture in which or with which the system of the present disclosure can be implemented, in accordance with an embodiment of the present disclosure.

Referring to FIG. 2A that illustrates an exemplary network architecture 100 in which or with which system 106 of the present disclosure can be implemented, in accordance with an embodiment of the present disclosure. As illustrated, the exemplary architecture 100 includes a planning server 106 equipped with an AI engine 214 for planning of the next generation network which complements an existing telecom deployment. The planning server 106 may he further coupled to one or more user equipment 102-1, 102-2, 102-3, . . . 102-n (collectively referred to as user equipment 102 and individually referred to as user equipment 102 hereinafter) communicatively coupled through a network 104.

In accordance with an embodiment and as illustrated in FIG. 2A, the architecture can enable telecom overlay deployment in an area. The planning server 106 may include an AI engine 214 that may be configured to build a plurality of grids of a predefined size and determine one or more solution sets for each grid of the plurality of grids.

In an embodiment, the set of solutions for overlay deployment may be checked using the user equipment via set of instructions residing on any operating system, including but not limited to, Android™, iOS™, and the like. In an embodiment, the one or more user equipment may be any smart computing devices and correspond to any electrical, electronic, electro-mechanical or an equipment or a combination of one or more of the above devices. Smart computing devices may include, but not limited to, a mobile phone, smart phone, IoT Devices, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user-configured, computer networked. device that can operate autonomously. A smart computing device is one of the appropriate systems for storing data and other private/sensitive information. The said device operates at all the seven levels of ISO reference model, but the primary function is related to the application layer along with the network, session and presentation layer with any additional features of a touch screen, apps ecosystem, physical and biometric security, and the like.

The smart computing devices or the user equipment may include smart phones having mobility wireless cellular connectivity device that may allow end-users to use services on 2G, 3G, 4G or 5G mobile broadband Internet connections with an advanced mobile operating system which combines features of a personal computer operating system with other features useful for mobile or handheld use. The smartphones can access the Internet, have a touchscreen user interface, can run third-party apps including the capability of hosting online applications, music players and are camera phones possessing high-speed mobile broadband 4G/5G LTE internet with video calling, hotspot functionality, motion sensors, mobile payment mechanisms and enhanced security features with alarm and alert in emergencies. Mobility devices may include smartphones, wearable devices, smart-watches, smart bands, wearable augmented devices, etc. For the sake of specificity, we will refer to the mobility device to both feature phone and smartphones in this disclosure but will not limit the scope of the disclosure and may extend to any mobility device in implementing the technical solutions. The above smart devices including the smartphone as well as the feature phone including IoT devices enable the communication on the devices.

The user equipment 102 may be communicatively coupled to the planning server 106 through the network 104. In an exemplary embodiment which is an example but not a limitation, the network 104 may be Evolved Universal Terrestrial Radio Access (E-UTRA) which is a radio access network standard meant to be a replacement of the UMTS and HSDPA/HSUPA technologies specified in 3GPP releases 5 and beyond. Unlike HSPA, LTE's E-UTRA is an entirely new air interface system, unrelated to and incompatible with W-CDMA. It provides higher data rates, lower latency and is optimized for packet data. The earlier UTRAN is the radio access network (RAN) was defined as a part of the Universal Mobile Telecommunications System (UMTS), a third-generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. As the demand for mobile data and voice access continues to increase, research and development continue to advance the technologies not only to meet the growing demand for access, but to advance and enhance the user experience with user device. Sonic of the technologies that have evolved starting GSM/EDGE, UMTS/HSPA, CDMA2000/EV-DO and TD-SCDMA radio interfaces with the 3GPP Release 8, e-UTRA is designed to provide a single evolution path for providing increases in data speeds, and spectral efficiency, and allowing the provision of more functionality.

As certain way of example and not by way of limitation, the present disclosure may use a new technology NB-IoT in release 13 for 3GPP. The low-end IoT applications can be met with this technology. It has taken efforts to address IoT markets with completion of standardization on NB-IoT. The NB-IoT technology has been implemented in licensed bands. The licensed bands of LTE are used for exploiting this technology. This technology makes use of a minimum system bandwidth of 180 kHz i.e. one PRB (Physical Resource Block) is allocated for this technology. The NB-IoT can be seen as a separate RAT (Radio Access Technology). The NB-IoT can be deployed in 3 modes as: "in-band", "guard band" and "standalone". In the "in-band" operation, resource blocks present within LTE carrier are used. There are specific resource blocks reserved for synchronization of LTE signals which are not used for NB-IoT. In "guard band" operation, resource blocks between LTE carriers that are not utilized by any operator are used. In "standalone" operation, GSM frequencies are used, or possibly unused LTE bands are used. Release 13 contains important refinements like discontinuous reception (eDRX) and power save mode. The PSM (Power Save Mode) ensures battery longevity in release 12 and is completed by eDRX for devices that need to receive data more frequently.

Figure 2B:
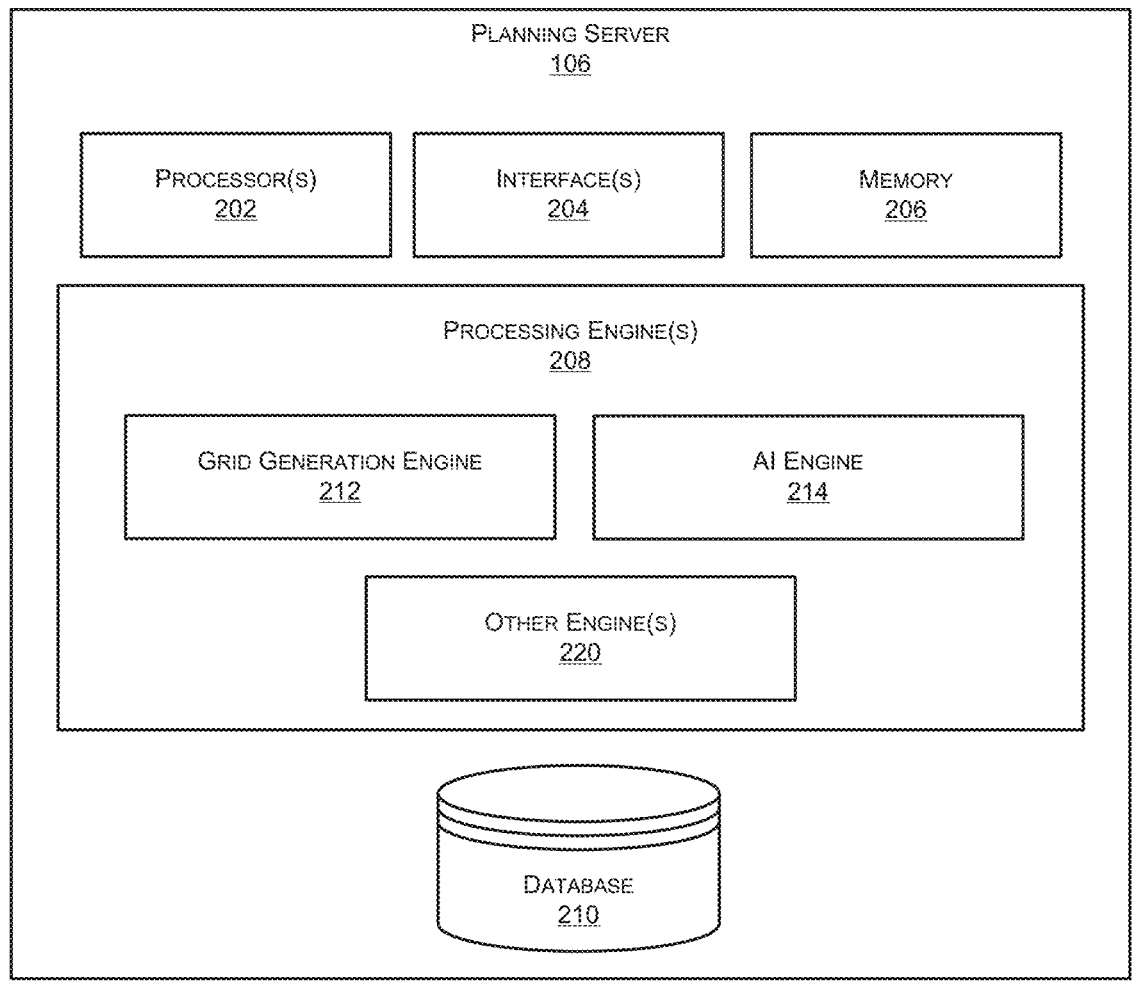
FIG. 2B illustrates an exemplary representation of system or a planning server, in accordance with an embodiment of the present disclosure.

FIG. 2B illustrates an exemplary representation of system or a planning server, in accordance with an embodiment of the present disclosure.

In an aspect, the system (106)/user equipment 102 may comprise one or more processor(s) 202. The one or more processor(s) 202 may be implemented as one or more microprocessors, microcomputers, microcontrollers, digital signal processors, baseband digital processors, central processing units, logic circuitries, and/or any devices that process data based on operational instructions. Among other capabilities, the one or more processor(s) 202 may be configured to fetch and execute computer-readable instructions stored in a memory 204 of the system 106. The memory 204 may be configured to store one or more computer-readable instructions or routines in a non-transitory computer readable storage medium, which may be fetched and executed to create or share data packets over a network service. The memory 206 may comprise any non-transitory storage device including, for example, volatile memory such as RAM, or non-volatile memory such as EPROM, flash memory, and the like.

In an embodiment, the modelling system 106/user equipment (102) may include an interface(s) 204. The interface(s) 204 may comprise a variety of interfaces, for example, interfaces for data input and output devices, referred to as I/O devices, storage devices, and the like. The interface(s) 204 may facilitate communication of the modelling system 106. The interface(s) 204 may also provide a communication pathway for one or more components of the user equipment 102. Examples of such components include, but are not limited to, processing engine(s) 208 and a database 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the system 106/user equipment 102 may comprise the machine-readable storage medium storing the instructions and the processing resource to execute the instructions, or the machine-readable storage medium may be separate but accessible to the system 106/user equipment 102 and the processing resource. In other examples, the processing engine(s) 208 may be implemented by electronic circuitry.

The processing engine 208 may include one or more engines selected from any of a grid generation engine 212, an Artificial Intelligence (AI) Engine 214, and other engines 216.

In an exemplary embodiment, the grid generation engine may be configured to build a plurality of grids of a pre-defined size. The plurality of grids corresponds to a plurality of macro cells and small cells associated a plurality of user equipment operatively coupled to the network. The AI engine 214 may be configured to extract a set of samples pertaining to spatial measurement of the grids observed from the area. The spatial measurement samples may pertain to latitude and longitude, traffic consumed, serving cell identifier, user handset categorization and cell capacity indicator. The AI engine 214 may then map the extracted set of samples onto the plurality of grids of and thus based on the mapped extracted samples and deployment criteria, the AI engine 214 may determine one or more solution sets for each of the grid.

Figure 3:
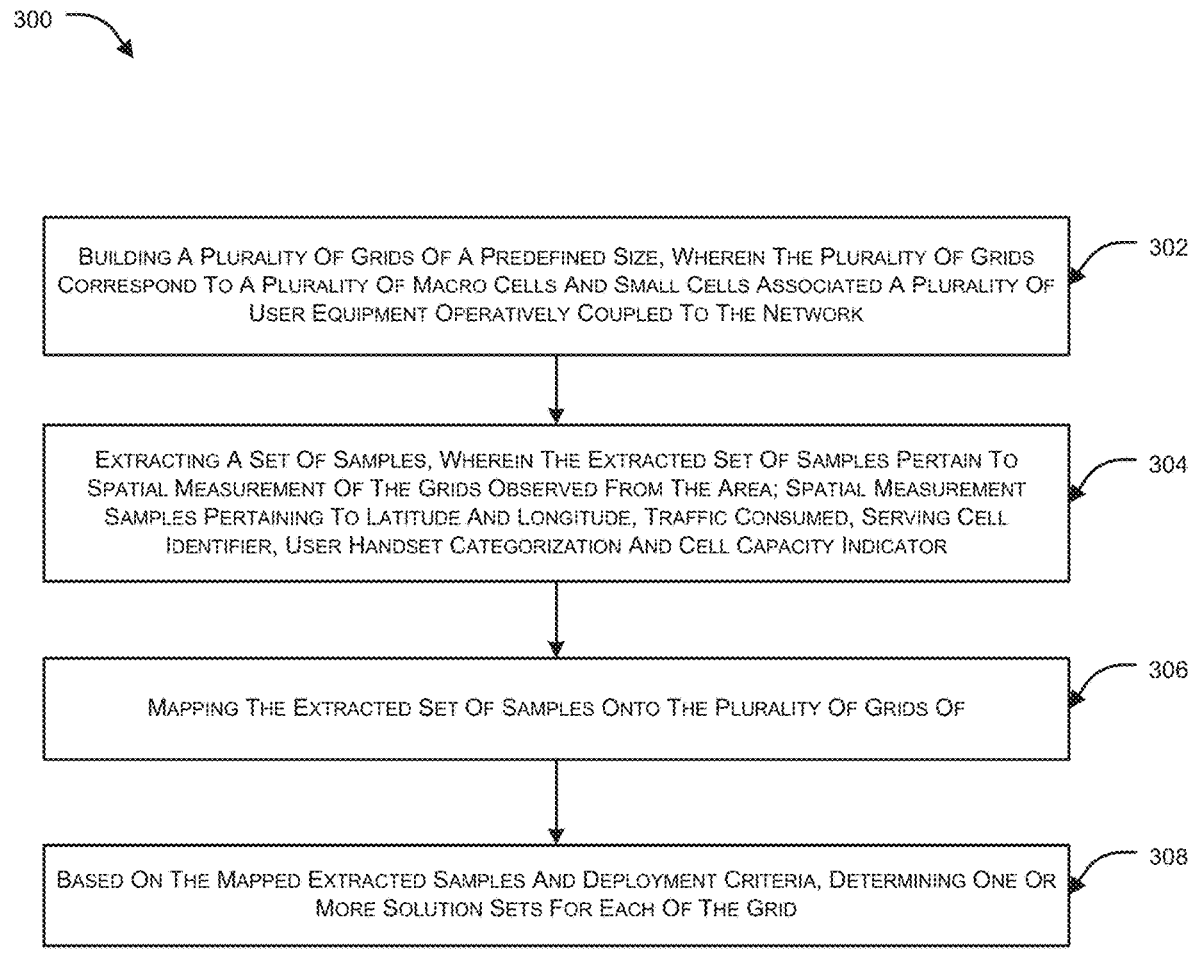
FIG. 3 illustrates exemplary method flow diagram depicting a method for facilitating telecom deployment solutions, in accordance with an embodiment of the present disclosure.

FIG. 3 illustrates exemplary method flow diagram depicting a method for facilitating telecom deployment solutions, in accordance with an embodiment of the present disclosure.

At step 402, the method includes the step of building a plurality of grids of a predefined size. The plurality of grids corresponds to a plurality of macro cells and small cells associated a plurality of user equipment operatively coupled to the network. Further at step 404, the method includes the step of extracting a set of samples. The extracted set of samples pertain to spatial measurement of the grids observed from the area where the spatial measurement samples correspond to latitude and longitude, traffic consumed, serving cell identifier, user handset categorization and cell capacity indicator.

Furthermore, at step 404, the method includes the step of mapping the extracted set of samples onto the plurality of grids of; and based on the mapped extracted samples and deployment criteria, a step 406 of determining one or more solution sets for each of the grid.

In an aspect, the method includes automatically planning of the preferred overlay deployment solutions in an area A being the part of an existing telecom deployment, the method being performed by a planning server, and the method including building a collection of rectangular grids of size GA in an existing telecom area, A, by mapping each of the spatial measurement samples observed in the telecom area, A, onto a but not limited to rectangular spatial grid of size GA.

In another embodiment, the method further includes computing one or more aggregated parameters for each of the grid, the aggregation being done on all the measurement samples which are being mapped on to a grid. Further, the method includes, building a collection of all possible deployment solutions ST for the filtered set of grids, GF, the solution set being built by computing all possible deployment scenarios with respect to each of the grid in the GF. Each of the deployment solution being indexed by the grid in respect to which the solution is being built. Further, the method includes, computing one or more aggregated parameters for each of the solution in the solution set ST, the aggregation being done across all the grids which the deployment solution would cover, filtering the collection of all possible deployment solutions. ST, based on the values of one or more aggregated parameters computed for each of the solution, the filtered set of solutions being called SF and finally selecting a subset of deployment solutions S from the filtered set of solutions, SF, as the final set of overlay deployment solutions for the area A.

Further, the embodiments of the present disclosure may relate to the planning of a radio network and includes various sub elements, and each spatial measurement sample may provide values of spatial location in terms of latitude and longitude, traffic consumed, serving cell identifier, user handset categorization, cell capacity indicator and the like. In another embodiment, the grid size may be configurable for a planning run and where a grid may be identified by the latitude and longitude of the centroid of the grid. The set of samples or the aggregated parameters against each grid may be total traffic consumed, list of serving cell identifiers, user handset categorization map, map of aggregated cell capacity indicator and the like.

In yet another embodiment, GF is constructed by removing grids which may have total traffic below a certain threshold, called as Grid Traffic threshold (GTH). Further the GTH could he made configurable. The GF may be constructed by including grids which are having capacity indicator of the dominant cell below a configurable threshold and the solution set may include any or a combination of macro and outdoor small cell (ODSC) solutions on each of the grid of GF.

In yet another embodiment, each macro solution planned against a grid in GF may be mapped to a location in the grid and may span a configurable minimum coverage radius in all directions and each macro solution planned against a grid in GF may include a list of grids enclosed in the minimum coverage radius of the macro solution and each macro solution planned against a grid in GF may include parameters such as aggregated total traffic, aggregated map of user handset categorization and the aggregated map of cell capacity indicator, the aggregation being done in all the grids enclosed in the minimum coverage radius of the macro solution.

In an exemplary embodiment, which is in a way of example but not as limitation, each ODSC solution planned against a grid in GF may be mapped to a location in the grid for a 1+0 configuration but not limited to it, meaning the ODSC location primarily may provide coverage only but not limited to, in the parent grid. In another embodiment, each ODSC solution planned against a grid in GF may be mapped to a location in the grid for a 1+1 configuration but not limited to it, meaning the ODSC location primarily may provide coverage in the parent grid and at least one of the adjacent grids subject to availability of the adjacent grid in the GF; wherein each ODSC solution planned against a grid in GF may be mapped to a location in the grid for a 1+2 configuration but not limited to it, meaning the ODSC location primarily may provide coverage in the parent grid and at least two of the adjacent grids subject to availability of the at least two adjacent grids in the GF but not limited to it. In another exemplary embodiment, but not as a limitation, each ODSC solution planned against a grid in GF may be mapped to a location in the grid for a 1+3 configuration but not limited to it, meaning the ODSC location primarily may provide coverage in the parent grid and at least three of the adjacent grids subject to availability of the at least three adjacent grids in the GF but not limited to it.

In yet another exemplary embodiment, each ODSC solution planned against a grid in GF may include parent grid and zero or more adjacent grids. Each ODSC solution planned against a grid in GF may include parameters such as aggregated total traffic, aggregated map of user handset categorization, the aggregated cell capacity indicator and the like, the aggregation being done in parent grid and zero or more adjacent grids forming the part of ODSC solution. In yet another exemplary embodiment, the set of solutions having aggregated traffic greater than a configurable threshold may be included in filtered set of solutions, SF. The set of solutions having aggregated number of handsets above a certain category exceeding a configurable threshold may he included in filtered set of solutions, SF.

Figure 4:
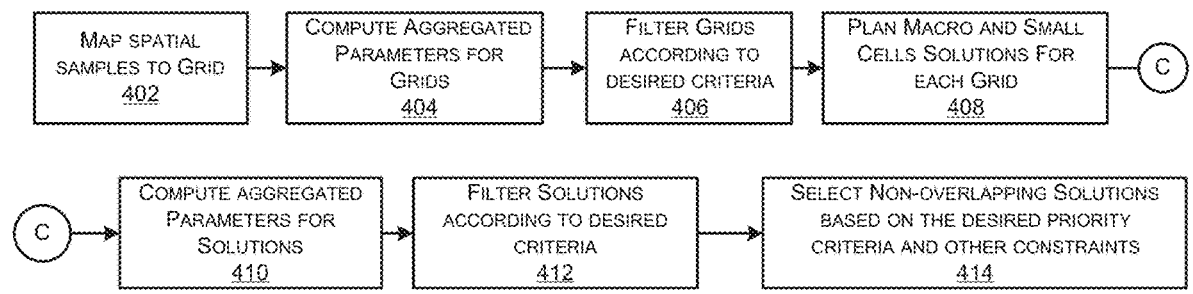
FIG. 4 illustrates an exemplary proposed automated planning pipeline in accordance with an embodiment of the present disclosure.

In yet another exemplary embodiment, the set of solutions having aggregated cell capacity indicator below a configurable threshold may be included in filtered set of solutions, SF and to choose a final set of solutions in SF, macro solutions may be being iterated at a higher priority over the ODSC solutions. Before beginning the iteration on macro solutions, the macro solutions may be ordered based on one or more parameters computed against each macro solution. In an exemplary embodiment, during the iteration, macro solutions may be selected in the order of iteration subjected to the condition that on selection of a macro solution, all the remaining solutions (including the remaining macro and ODSC solutions) may be checked for any grid overlap with the selected macro solution, if an overlap is found than the set of solutions may be discarded from the iteration list. In another embodiment, to choose the final set of solutions in SF, leftover ODSC solutions may be iterated after the selection of macro solutions, the iteration being done to select the ODSC solutions. The ODSC solutions may be iterated in order of 1+3, 1+2, 1+1, 1+0 respectively but not limited to it. During the iteration, ODSC solutions may be selected in the order of iteration subjected to the condition that on selection of an ODSC solution, all the remaining ODSC solutions may be checked for any grid overlap with the selected ODSC solution, if an overlap is found than those ODSC solutions may be discarded from the iteration list, FIG. 4 illustrates automated planning pipeline according to primary aspects of the proposed invention. The planning pipeline (also referred to as pipeline hereinafter) may be executed on a planning server. Further, the planning pipeline may operate on the collection of geo-location samples captured during a time period T for a planning area A. As shown in the FIG. 4, the first step 400 in the pipeline maps each of the spatial samples to a geo spatial rectangular grid of a certain size. The size of grid can be made configurable. After mapping samples to grids, step 402 computes a set of parameters for each of the grid, the parameters being computed by aggregating the variety of data contains in samples mapped to the grid. Step 404, then filters the grids based on one or more conditions that could be provisioned for each of the planning pipeline separately. Step 406 operates on the filtered set of grids to plan solutions for each of the filtered grid. The solution for each of the grid can consists of a macro solution and one or more outdoor small cell solutions. There could be multiple outdoor solutions possible for each of the grid with each solution being targeted to cover the parent grid and certain number of adjacent grids. Step 408 computes a set of parameters for each of solution being computed by the Step 404, the parameters set being computed by aggregating the parameters of all those grids which are affected by the solution. Step 410 filters the various solutions based on one or more conditions on the solution parameters that could be provisioned for each of the planning pipeline separately. Step 412 operates on filtered set of solutions to come up with a final solution subset as the output the planning pipeline. To come with the final solution subset, Step 412 could iterate thru the filtered solutions in a particular order. For each of the iteration step, a prioritized solution is selected followed by elimination of all the other solutions overlapping with the selected solution. The priority order could be made configurable for each of the pipeline.

Figure 5:
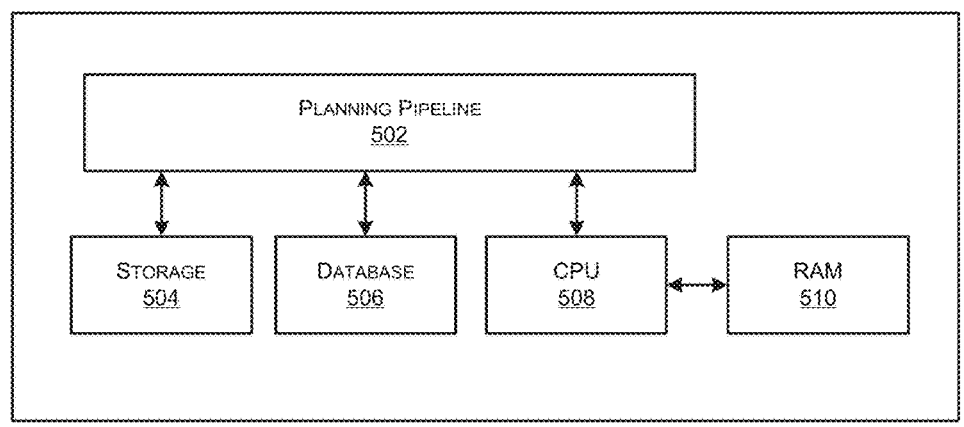
FIG. 5 illustrates an exemplary proposed planning serving block diagram in accordance with an embodiment of the present disclosure.

FIG. 5 illustrates various modules of a planning server in accordance with various aspects of the invention 502 is the key module of the planning server, called as Planning Pipeline executor (PPE). PPE picks up unexecuted planning requests from the Database 504 which could be implemented by any of popular Databases, such as Oracle. PostgreSQL, etc. A planning request could consist of a request ID, values for various configurable parameters and the details to get spatial samples data, spatial data details being comprising of the location info of the spatial samples in a storage module 504, time of interest and the desired planning area. Storage module 504 could be implemented by any of storage framework including the Hadoop Distributed File System (HDFS) but not limited to it. HDFS can store large amount of data across distributed machines in reliable and efficient way. Planning Pipeline Executor could be implemented by a monolithic software application or it could be implemented by a series of coordinated microservices, with each microservice targeting a specific part of the pipeline execution. Further, the pipeline executor could be implemented by a series of coordinated Apache Spark applications, with each of application targeting a specific part of the pipeline execution. Implantation using Spark Jobs is desirable to execute planning requests where hundreds of millions of spatial samples need to work on by the pipeline executor. 508 and 510 depict the CPU and RAM for the planning server to enable the execution of various modules of the planning server.

Figure 6:
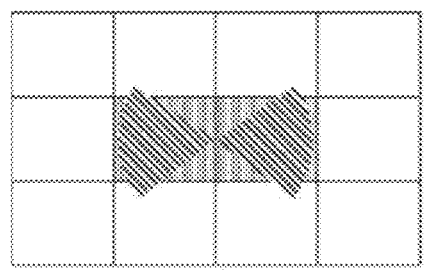
FIG. 6 illustrates an exemplary proposed Outdoor Small Cell Solution Types in accordance with an embodiment of the present disclosure.
Figure 6:
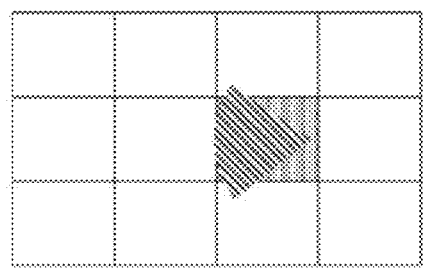
Figure 6:
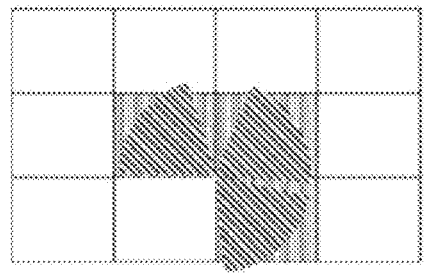
Figure 6:
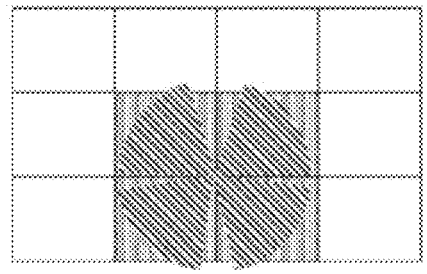

FIG. 6 represent various exemplary of the possible options for Outdoor Small Cell Solutions with respect to a parent grid. As illustrated an Outdoor Small Cell Solution (ODSC) in 1+1 orientation by way of an example and not as limitation. This is possible when there is at least one grid adjacent to grid for which an ODSC is being planned. In this orientation, the ODSC solution could cover two grids by installing two ODSC cells in appropriate orientation at a suitable location near the common boundary of the two grids. 701 shows an Outdoor Small Cell Solution (ODSC) in 1+0 orientation. This is always possible when an ODSC solution is being planned with respect to a grid. In this orientation, the ODSC solution could cover the underlying grid only at a suitable location near the center of the underlying grid. 702 shows an Outdoor Small Cell Solution (ODSC) in 1+2 orientation. This is possible when there are at least two grids adjacent to the grid for which an ODSC is being planned. In this orientation, the ODSC solution could cover three grids by installing three ODSC cells in appropriate orientation at a suitable location near the corner of intersection of the three grids. 703 shows an Outdoor Small Cell Solution (ODSC) in 1+3 orientation. This is possible when there are at least three grids adjacent to the grid for which an ODSC is being planned. In this orientation, the ODSC solution could cover four grids by installing four ODSC cells in appropriate orientation at a suitable location near the corner of intersection of the four grids.

Figure 7:
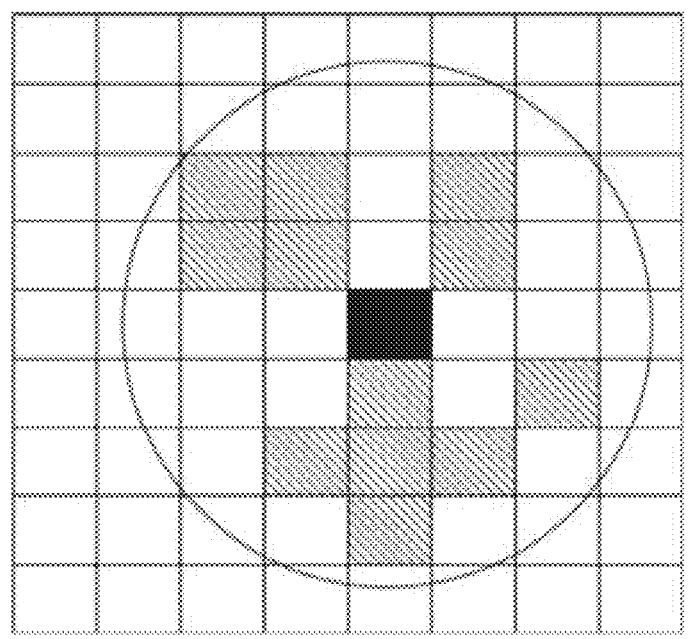
FIG. 7 illustrates an exemplary proposed Macro Cell Deployment Criteria in accordance with an embodiment of the present disclosure.

FIG. 7 represents an example of a macro solution with respect to a parent grid 701. 702 depicts the coverage area of the macro solution governed by a configurable parameter called as 'minimum overlapping radius for a macro solution'. 703 represents the set of other grids which fall into the coverage area of the macro solution, all these grids are being called as child grids for the macro solution.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

ADVANTAGES OF THE PRESENT DISCLOSURE

The present disclosure provides for a system that facilitates various knobs in terms of configuration parameters to tweak the planning requirements in planning stages in real time.

The present disclosure provides for a system that facilitates implementation of solutions in a pipelined manner to ensure reliability and scalability and implemented by independent modules.

The present disclosure provides for a planning approach where various option of configuration are available for Outdoor Small Cells solutions.

The present disclosure provides for a planning approach for both macro and outdoor small cells solution for next generation telecom network.

The present disclosure provides for a system which complements an existing telecom deployment to achieve the desired KPIs from the combined network for both macro and small cell planning in an existing network in a cost-effective method to deploy ODSC cells and Macro Cells in a heterogeneous network.

We claim:
1. A system facilitating telecom overlay deployment in an area, said system comprising:
a plurality of user equipment operatively coupled to a network;

a planning server comprising a processor that executes a set of executable instructions that are stored in a memory, upon which execution, the processor causes the system to:

build a plurality of grids of a predefined size;

extract a set of samples, wherein the extracted set of samples pertain to spatial measurement of the plurality of grids observed from the area, wherein the spatial measurement pertaining to latitude and longitude, traffic consumed, serving cell identifier, user handset categorization and cell capacity indicator;

map the extracted set of samples onto the plurality of grids; and based on the mapped extracted samples and deployment criteria, determine one or more solution sets for each grid of the plurality of grids, wherein a plurality of filtered grids are constructed by a combination of removal and inclusion of predefined grids from the plurality of grids, wherein the removal of predefined grids correspond to grids having total traffic below a predefined grid traffic threshold, and wherein the inclusion of grids correspond to grids having a capacity indicator of dominant cell below a second predefined threshold.

2. The system as claimed in claim 1, wherein size of the plurality of grids is configurable for a planning run and wherein a grid is identified by the latitude and longitude of centroid of the grid.

3. The system as claimed in claim 1, wherein the extracted set of samples are total traffic consumed, list of serving cell identifiers, user handset categorization map and the map of cell capacity indicator.

4. The system as claimed in claim 1, wherein the one or more solution sets are comprised of any or a combination of solutions for macro cells for each of the plurality of grids, solutions for outdoor small cell (ODSC) for each of the plurality of grids comprised of solutions in one or more configurations on each of the grid of filtered set of grid (GF).

5. The system as claimed in claim 1, wherein the one or more solutions corresponding to macro cells for the plurality of filtered grids are mapped to a location in the grid spanning a configurable coverage radius, wherein the one or more solutions corresponding to macro cells for the plurality of filtered grids comprise a list of grids enclosed in the configurable coverage radius, wherein the one or more solutions corresponding to macro cells for the plurality of filtered grids comprise of total traffic, aggregated map of user handset categorization and the aggregated map of cell capacity indicator the plurality of filtered grids enclosed in the configurable coverage radius.

6. The system as claimed in claim 1, wherein the one or more solutions corresponding to the ODSC for the plurality of filtered grids are mapped to a location in the grid for any or a combination of a parent grid and one or more adjacent grids subject to availability of the one or more adjacent grids in the filtered grids, wherein the one or more solutions corresponding to the ODSC for filtered grids comprise of total traffic, aggregated map of user handset categorization and the aggregated map of cell capacity indicator the plurality of filtered grids in any or a combination of the parent grid and the one or more adjacent grids.

7. The system as claimed in claim 1, wherein a filtered set of solution comprises of solutions having any or a combination of aggregated traffic greater than a first configurable threshold, aggregated number of handsets above a predefined category exceeding a second configurable threshold and aggregated cell capacity indicator below a third configurable threshold.

8. The system as claimed in claim 1, wherein the one or more solutions corresponding to the macro cells are iterated at a higher priority over the ODSC solutions on selection of a first macro solution of the one or more solutions, wherein upon selection of the first macro solution, remaining one or more solutions corresponding to the macro cells and the ODSC are checked for any grid overlap with the selected first macro solution.

9. The system as claimed in claim 8, wherein one or more solutions are discarded if an overlap between the one or more solutions and the first macro solution is determined, wherein one or more remaining ODSC solutions are iterated after the selection of the first macro solution, wherein iteration is being done to select the one or more ODSC solutions in any or a combination of the parent grid and the one or more adjacent grids.

10. The system as claimed in claim 9, wherein during the iteration, the one or more solutions corresponding to the ODSC are selected in order of iteration subjected to selection of a first ODSC solution, wherein upon selection of the first ODSC solution, remaining ODSC solutions are checked for any grid overlap with the selected first ODSC solution, wherein if an overlap is found, the overlapped one or more ODSC solutions are discarded from the iteration list.

11. A method facilitating telecom overlay deployment in an area, said method comprising:

building a plurality of grids of a predefined size, wherein the plurality of grids corresponds to a plurality of macro cells and small cells associated with a plurality of user equipment operatively coupled to a network;

extracting a set of samples, wherein the extracted set of samples pertain to spatial measurement of the grids observed from the area; wherein the spatial measurement pertaining to latitude and longitude, traffic consumed, serving cell identifier, user handset categorization and cell capacity indicator;

mapping the extracted set of samples onto the plurality of grids; and based on the mapped extracted samples and deployment criteria, determining one or more solution sets for each of the grid of the plurality of grids, wherein a plurality of filtered grids are constructed by a combination of removal and inclusion of predefined grids from the plurality of grids, wherein the removal of predefined grids correspond to grids having total traffic below a predefined grid traffic threshold, and wherein the inclusion of grids correspond to grids having a capacity indicator of dominant cell below a second predefined threshold.

12. The method as claimed in claim 11, wherein the one or more solutions corresponding to outdoor small cell (ODSC) for plurality of filtered grids are mapped to a location in the grid for any or a combination of a parent grid and one or more adjacent grids subject to availability of the one or more adjacent grids in the plurality of filtered grids, wherein the one or more solutions corresponding to the ODSC for the plurality of filtered grids comprise of total traffic, aggregated map of user handset categorization and the aggregated map of cell capacity indicator the plurality of filtered grids in any or a combination of the parent grid and the one or more adjacent grids.

13. The method as claimed in claim 11, wherein a filtered set of solution comprises of solutions having any or a combination of aggregated traffic greater than a first configurable threshold, aggregated number of handsets above a predefined category exceeding a second configurable threshold and aggregated cell capacity indicator below a third configurable threshold.

14. The method as claimed in claim 11, wherein the one or more solutions corresponding to the plurality of macro cells are iterated at a higher priority over the ODSC solutions on selection of a first macro solution of the one or more solutions, wherein upon selection of the first macro solution, remaining one or more solutions corresponding to the plurality of macro cells and the ODSC are checked for any grid overlap with the selected first macro solution.

15. The method as claimed in claim 14, wherein one or more solutions are discarded if an overlap between the one or more solutions and the first macro solution is determined, wherein one or more remaining ODSC solutions are iterated after the selection of the first macro solution, wherein the iteration is being done to select the one or more ODSC solutions in any or a combination of the parent grid and the one or more adjacent grids.

16. The method as claimed in claim 15, wherein during the iteration, one or more solutions corresponding to the ODSC are selected in order of the iteration subjected to selection of a first ODSC solution, wherein upon selection of the first ODSC solution, remaining ODSC solutions are checked for any grid overlap with the selected first ODSC solution, wherein if an overlap is found, the overlapped one or more ODSC solutions are discarded from the iteration list.

* * * * *